United States Patent [19]
Kagoshima

[11] Patent Number: 5,731,911
[45] Date of Patent: Mar. 24, 1998

[54] ZOOM LENS SYSTEM

[75] Inventor: Kazuharu Kagoshima, Toyokawa, Japan

[73] Assignee: Minolta Co., Ltd., Osaka, Japan

[21] Appl. No.: 762,201

[22] Filed: Dec. 9, 1996

[30] Foreign Application Priority Data

Dec. 13, 1995 [JP] Japan ................................ 7-324444
Nov. 25, 1996 [JP] Japan ................................ 8-313360

[51] Int. Cl.[6] .................................................. G02B 15/14
[52] U.S. Cl. ........................................................ 359/689
[58] Field of Search .................................. 359/683, 686, 359/689

[56] References Cited

U.S. PATENT DOCUMENTS

| | | | |
|---|---|---|---|
| 4,938,572 | 7/1990 | Iwasaki | 359/689 |
| 5,015,077 | 5/1991 | Ueda | 359/389 |
| 5,062,695 | 11/1991 | Iwasaki | 359/689 |
| 5,270,866 | 12/1993 | Oizumi et al. | 359/689 |

*Primary Examiner*—Scott J. Sugarman
*Attorney, Agent, or Firm*—Price, Gess & Ubell

[57] ABSTRACT

A zoom lens system is provided with first, second, and third lens units from an enlargement side. The first, second, and third lens units have a negative refractive power, positive refractive power, and negative refractive power, respectively. The first lens unit has a first doublet lens composed by a biconvex lens and a biconcave lens. The second lens unit has a second doublet lens composed by a biconvex lens and a negative meniscus lens. During zooming from the longest focal length end to the shortest focal length end, the first lens unit is kept stationary and the second and third lens units are each moved monotonically.

22 Claims, 13 Drawing Sheets

FIG. 5
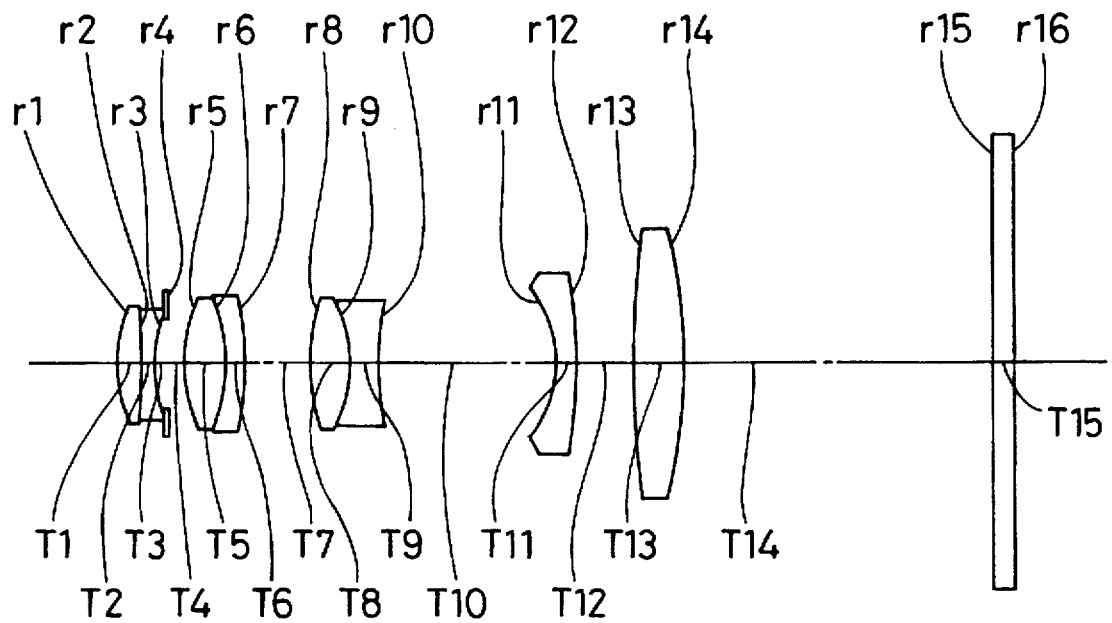
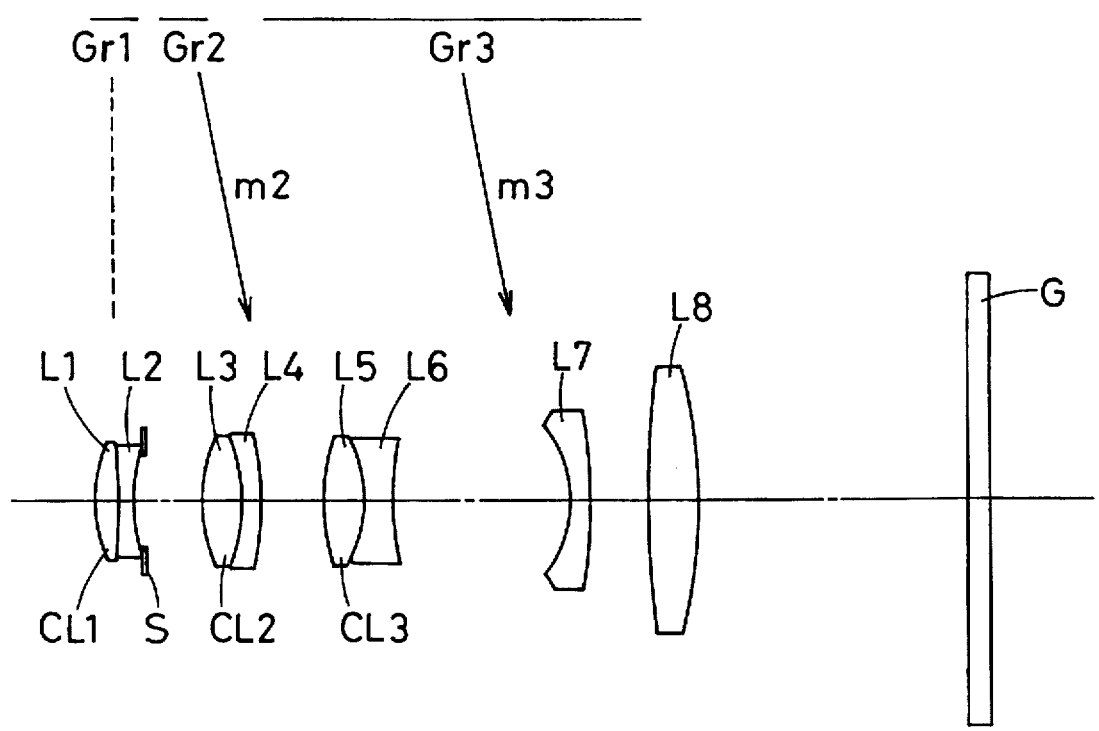

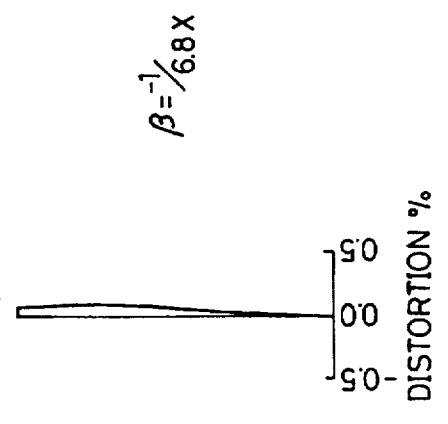
FIG. 8A
FNo.=12.3
FIG. 8B
W=9.3°
FIG. 8C
W=9.3°
β=−1/6.8x
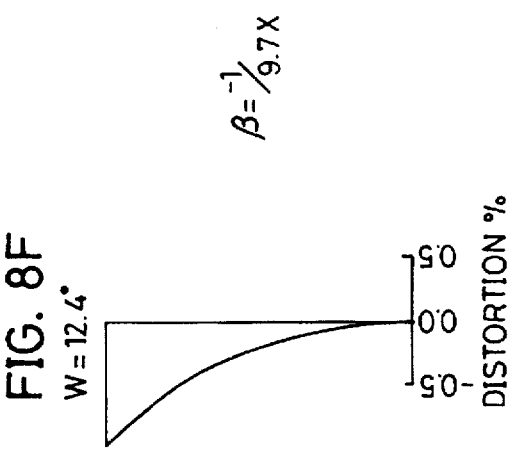
FIG. 8D
FNo.=9.5
FIG. 8E
W=12.4°
FIG. 8F
W=12.4°
β=−1/9.7x

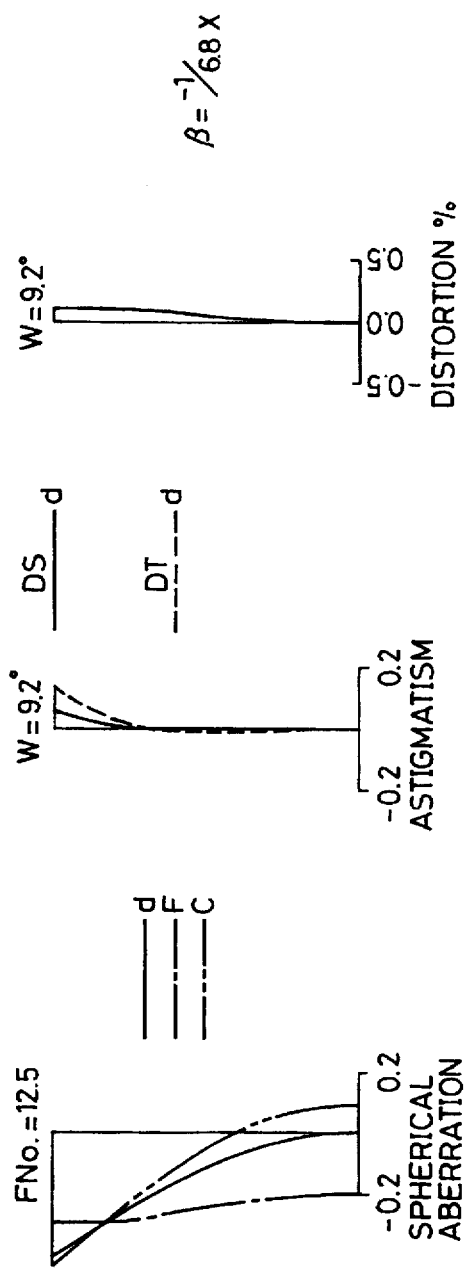
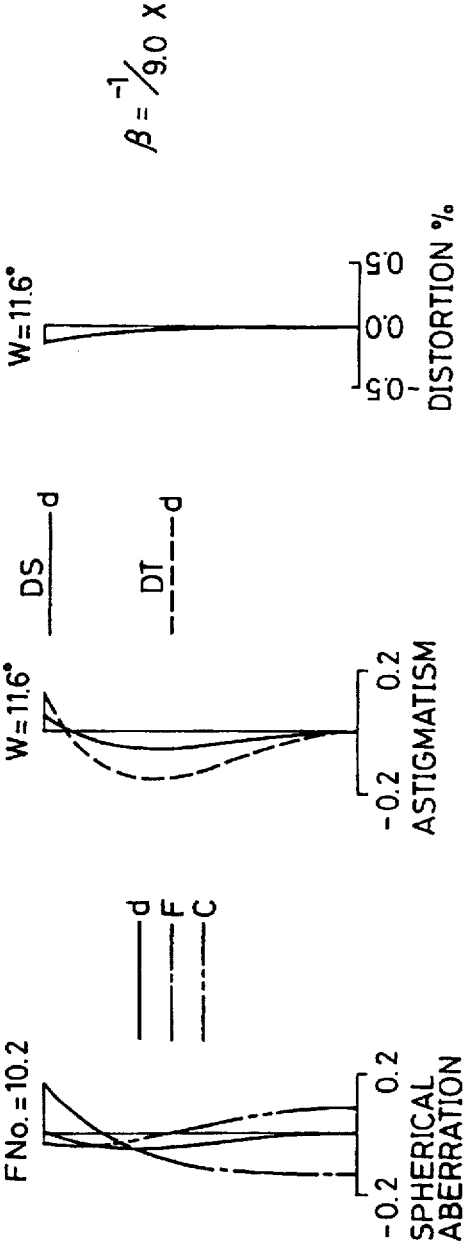

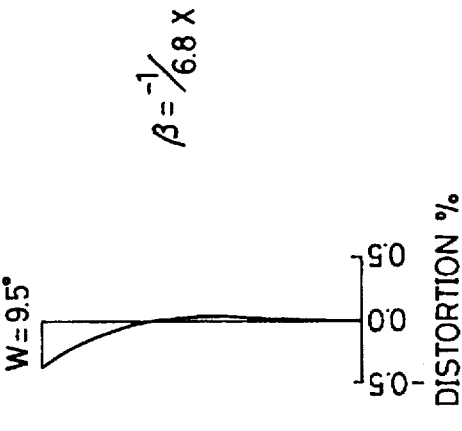
FIG. 10A
FNo.=10.9
FIG. 10B
W=9.5°
FIG. 10C
W=9.5°
β=-1/6.8 x
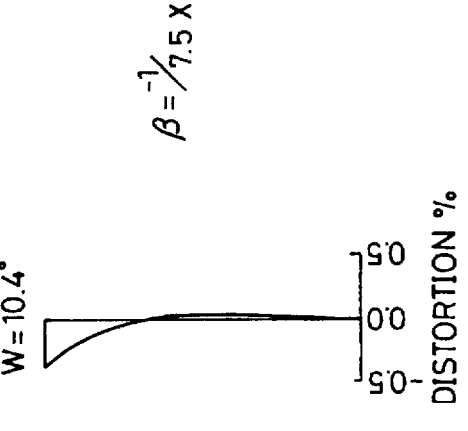
FIG. 10D
FNo.=10.2
FIG. 10E
W=10.4°
FIG. 10F
W=10.4°
β=-1/7.5 x

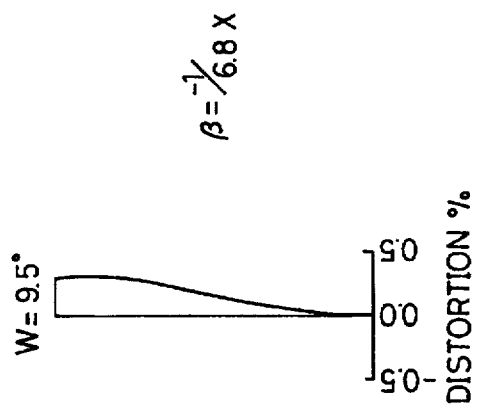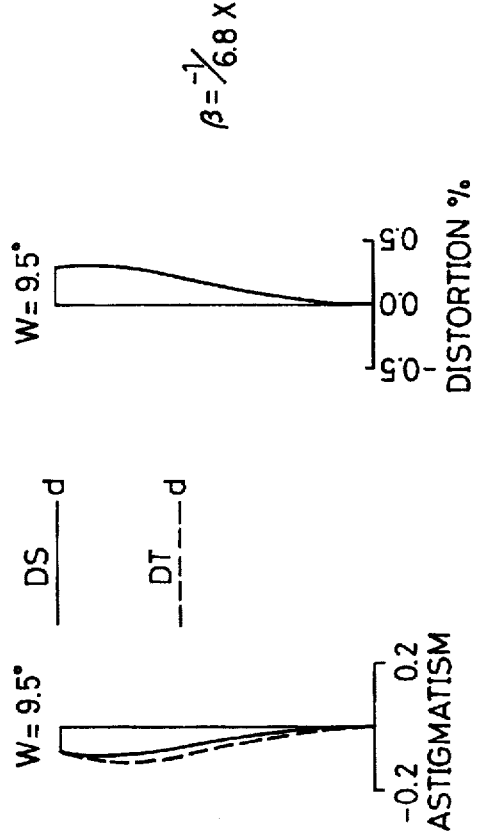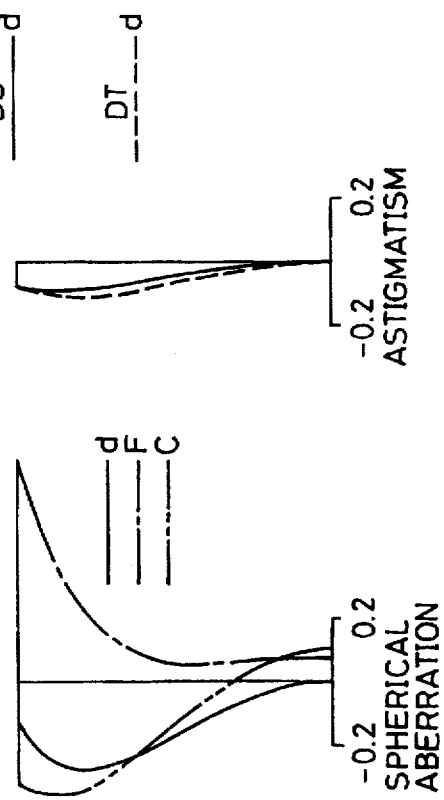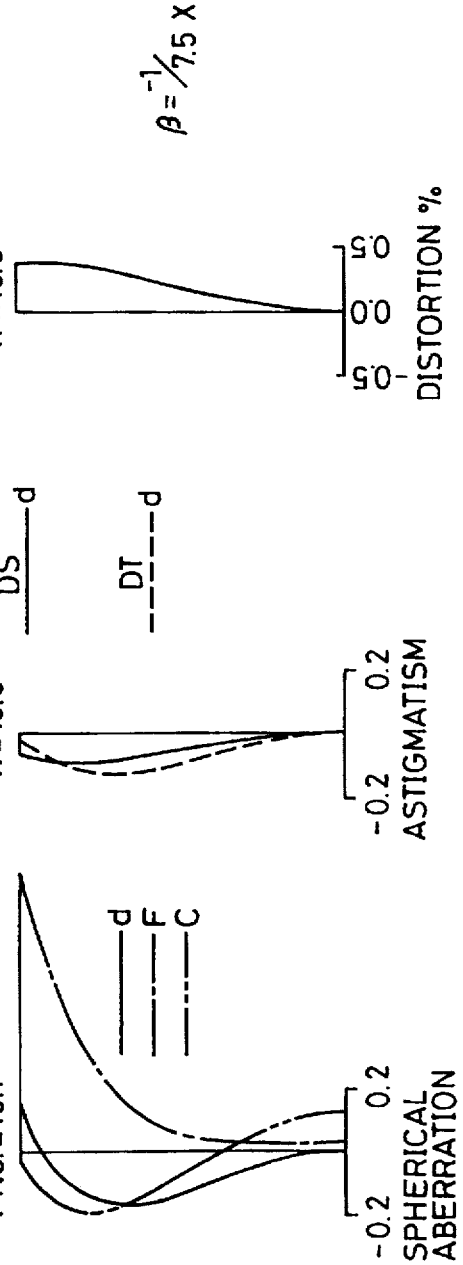

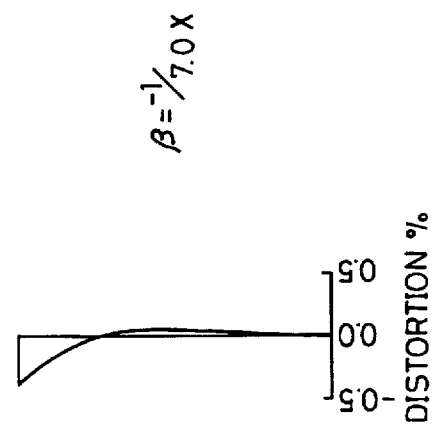
FIG. 12A
FNo.=11.0
FIG. 12B
W=9.7°
FIG. 12C
W=9.7°
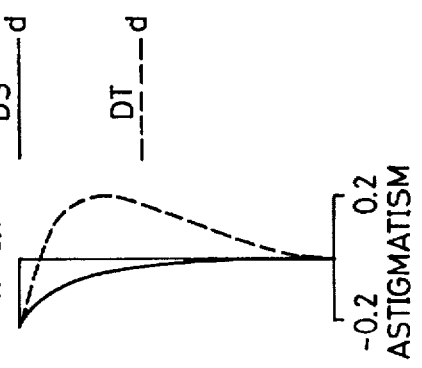
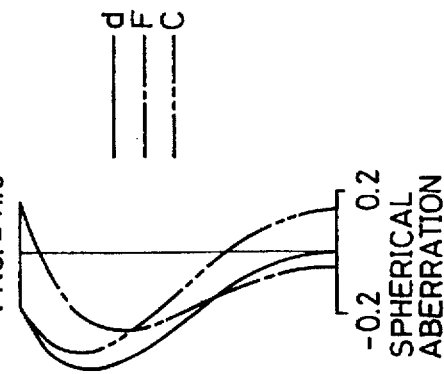
$\beta = -1/7.0 \times$
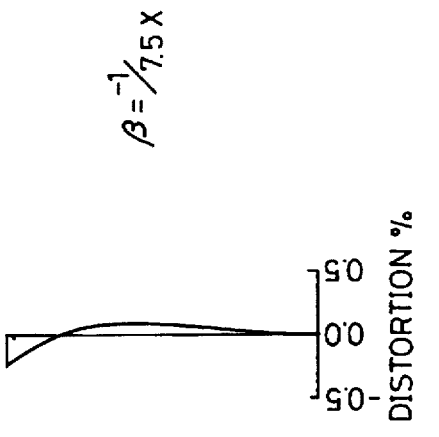
FIG. 12D
FNo.=10.5
FIG. 12E
W=10.2°
FIG. 12F
W=10.2°
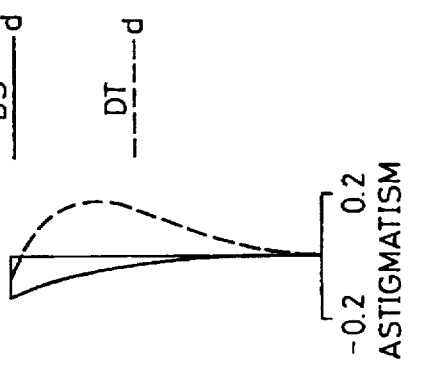
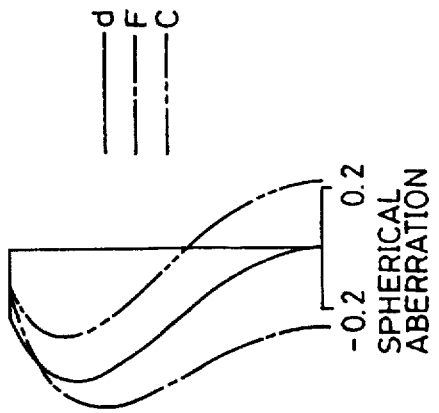
$\beta = -1/7.5 \times$ FNo.=10.9

W=9.5°

W=9.5°
$\beta^{-1} = 1/6.8 X$

FNo.=10.3

W=10.2°

W=10.2°
$\beta^{-1} = 1/7.5 X$

ZOOM LENS SYSTEM

BACKGROUND OF THE INVENTION

1. Field of the Invention

The present invention relates to a zoom lens system, particularly to a zoom lens system having a finite conjugate distance in which zooming is performed with the distance between the object point and the image point kept constant, and more particularly to a zoom lens system having a finite conjugate distance that can suitably be used as a projection optical system for apparatus such as microfilm readers, microfilm reader printers, and liquid crystal projectors.

2. Description of the Prior Art

Apparatus such as microfilm readers and microfilm reader printers have conventionally been employing a zoom lens system having a finite conjugate distance as a projection lens to enlarge and project microfilm images onto a screen. In addition, in some conventional examples of such apparatus, an image-rotating prism such as a Dove prism is disposed between the zoom lens system serving as a projection lens and the screen, that is, on the enlargement side of the zoom lens system, so that the image projected onto the screen can be rotated.

In apparatus as described above, it is essential to use a compact zooming lens system in order to reduce the size of the apparatus as a whole while securing sufficient space for the image-rotating prism.

As an example of a compact zoom lens system, the publication of Japanese Laid-Open Patent Application No. H4-328709 proposes a zoom lens system comprising, from the enlargement side, a first lens unit having a negative refractive power, an aperture diaphragm, a second lens unit having a positive refractive power, and a third lens unit having a negative refractive power. There, during zooming from the longest-focal-length end to the shortest-focal-length end, the first lens unit is kept fixed, whereas the second and the third lens units are each moved monotonically toward the reduction side in such a way that the distance between them varies first decreasingly and then increasingly. In this zoom lens system, the first lens unit consists of a positive meniscus lens with its convex side facing toward the enlargement side and a negative lens element. Moreover, in this zoom lens system, the second lens unit consists of, from an enlargement side, two positive lens elements, a doublet lens composed of a positive and a negative lens joined together, and positive lens element. Moreover, in this lens system, the third lens unit consists of, from an enlargement side, a negative lens element with its concave side facing toward the enlargement side and a biconvex lens element.

The zoom lens system according to the above publication has transverse magnifications β approximately between −1/9 and −1/16 when used with its enlargement side directed to the object point, and has a telephoto ratio ($\infty TL/f_L$, where $\infty TL$ represents the total length of the lens system in the arrangement for the case where the object point is assumed to be placed at an infinite distance, and $f_L$ represents the longest focal length) approximately between 0.85 and 0.87 at its longest-focal-length end. Moreover, this zoom lens system is compact enough, and can correct aberration properly.

However, the zoom lens system of the above publication is defective in that it cannot be used in the zooming-ratio range corresponding to transverse magnifications β between −1/7 and −1/9.

The reason is as follows. If the refractive power arrangement proposed in the above publication is applied to the designing of a zoom lens system having transverse magnifications β between −1/7 and −1/9 and having the same telephoto ratio, the value of $f_L$ inevitably becomes greater. As can be seen from the definition of the telephoto ratio $\infty TL/f_L$, the greater $f_L$ becomes, the greater $\infty TL$ also becomes. This means that the total length of the zoom lens system needs to be longer than in a zoom lens system having transverse magnifications β between −1/9 to −1/16. Thus, it is no more possible to achieve a compact zoom lens system.

Of course, by altering the telephoto ratio to approximately 0.7, it is possible to keep the total length of the zoom lens system almost the same in the zooming-ratio range corresponding to transverse magnifications β between −1/7 and −1/9 as in the zooming-ratio range corresponding to transverse magnifications between β −1/9 and −1/16. However, if the refractive power arrangement proposed in the above publication is applied to the designing of a zoom lens system having transverse magnifications β between −1/7 and −1/9 and having a telephoto ratio of, in this case, approximately 0.7 so as to reduce the total length of the lens system, the surfaces of the lenses need to have excessively strong refractive powers. Thus, it is no more possible to correct various types of aberration properly.

SUMMARY OF THE INVENTION

An object of the present invention is to provide a zoom lens system that is compact, with a telephoto ratio of approximately 0.7 at transverse magnifications between −1/7 and −1/9, and at the same time capable of correcting aberration satisfactorily.

To achieve the above object, according to one aspect of the present invention, a zoom lens system is provided with, from the enlargement side, a first lens unit having a negative refractive power as a whole and consisting only of a first doublet lens composed by joining together, from an enlargement side, a first lens element that is a biconvex lens and a second lens element that is a biconcave lens; a second lens unit having a positive refractive power as a whole and including, at its enlargement-side end, a second doublet lens composed by joining together, from an enlargement side, a third lens element that is a biconvex lens and a fourth lens element that is a negative meniscus lens with its concave surface facing toward an enlargement side; a third lens unit having a negative refractive power as a whole. Here, during zooming from a longest-focal-length end to a shortest-focal-length end, said first lens unit is kept fixed and said second and third lens units are each moved monotonically from an enlargement side to a reduction side.

BRIEF DESCRIPTION OF THE DRAWINGS

This and other objects and features of this invention will become clear from the following description, taken in conjunction with the preferred embodiments with reference to the accompanied drawings in which:

FIG. 5 is a cross-sectional view showing the lens arrangement of a fourth embodiment of the present invention;

3

Figure 6:
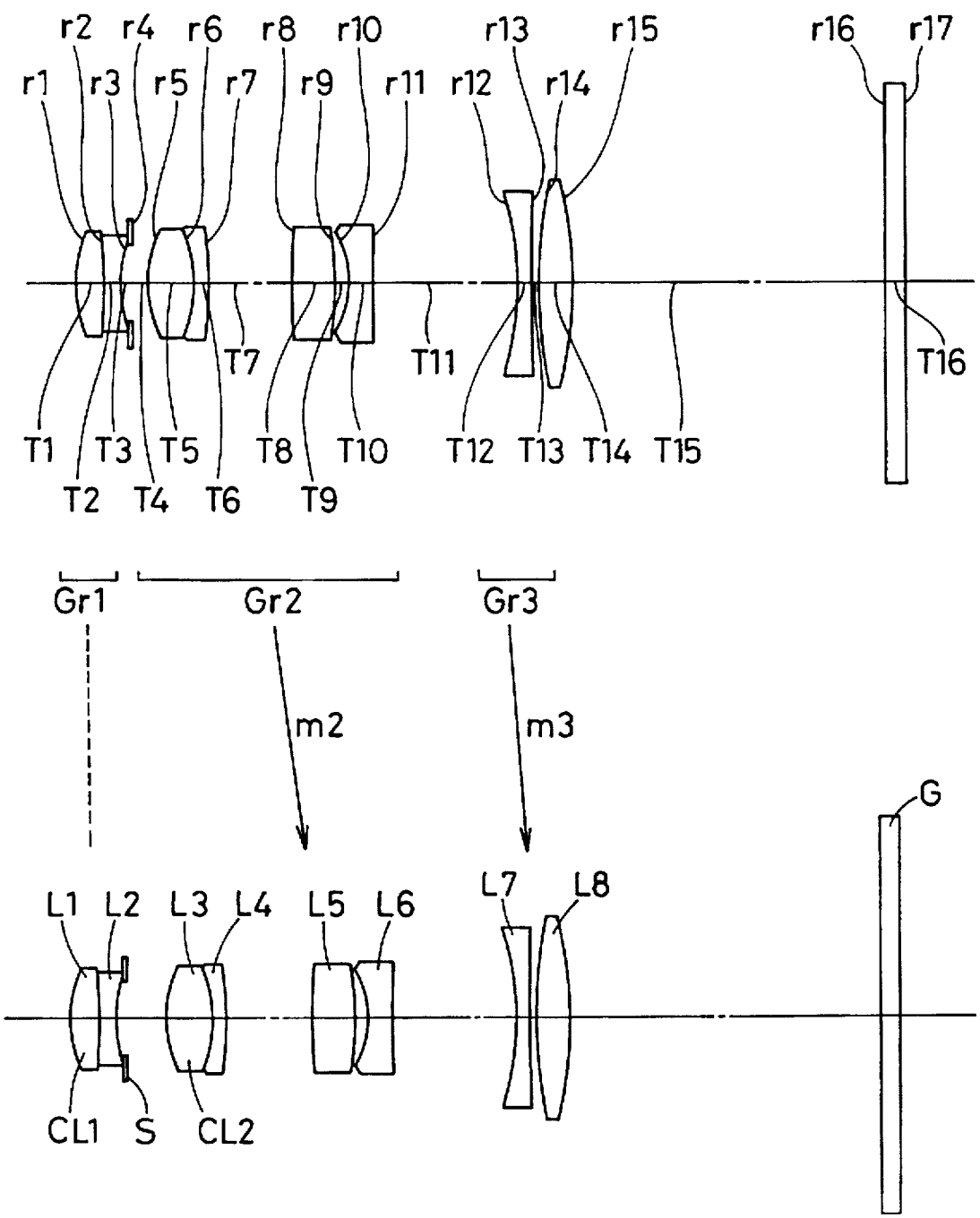
Figure 7:
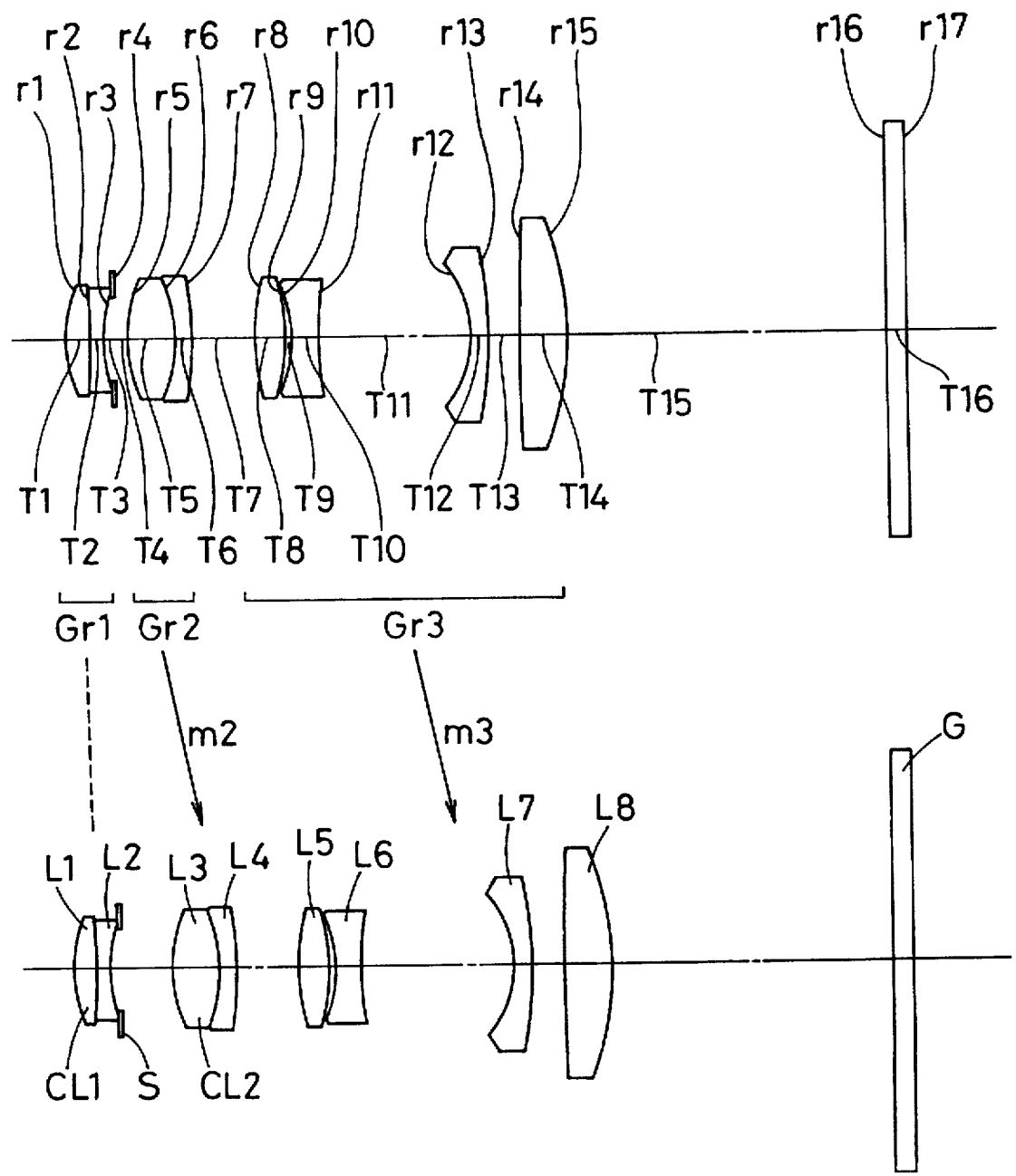
Figure 13A:
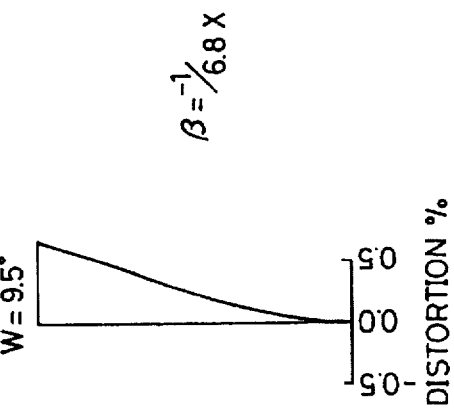
Figure 13B:
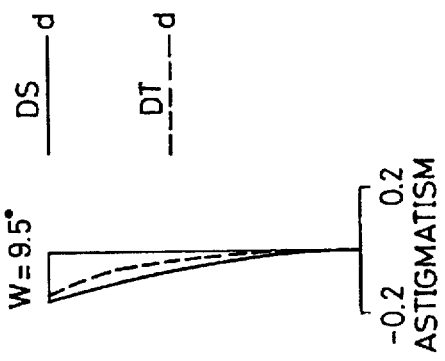
Figure 13C:
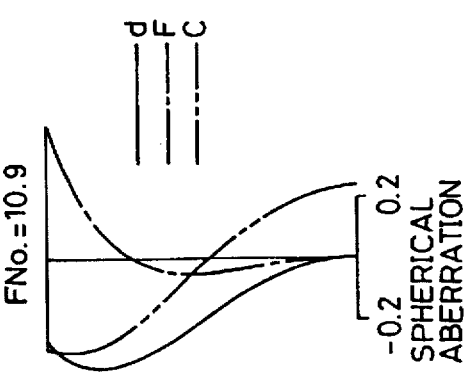
Figure 13D:
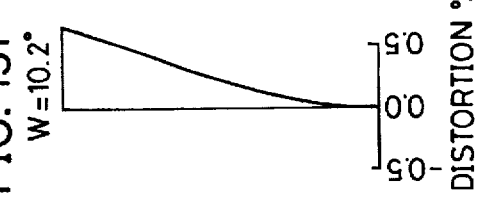
Figure 13E:
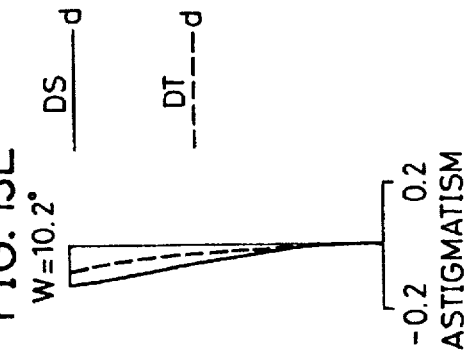
Figure 13F:
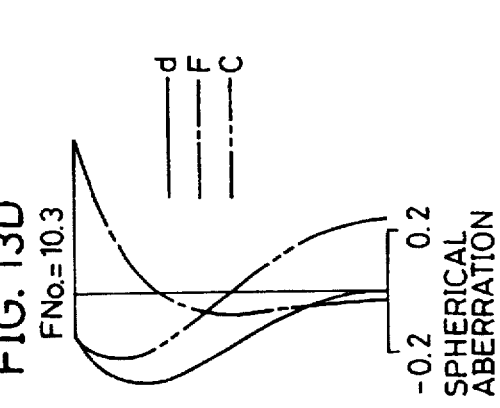

FIG. 6 is a cross-sectional view showing the lens arrangement of a fifth embodiment of the present invention;

FIG. 7 is a cross-sectional view showing the lens arrangement of a sixth embodiment of the present invention;

FIGS. 8A to 8F are diagrams showing aberration in the first embodiment;

FIGS. 9A to 9F are diagrams showing aberration in the second embodiment;

FIGS. 10A to 10F are diagrams showing aberration in the third embodiment;

FIGS. 11A to 11F are diagrams showing aberration in the fourth embodiment;

FIGS. 12A to 12F are diagrams showing aberration in the fifth embodiment; and

FIGS. 13A to 13F are diagrams showing aberration in the sixth embodiment.

DESCRIPTION OF THE PREFERRED EMBODIMENTS

Hereinafter, the zoom lens system according to the present invention will be described.

Figure 1:
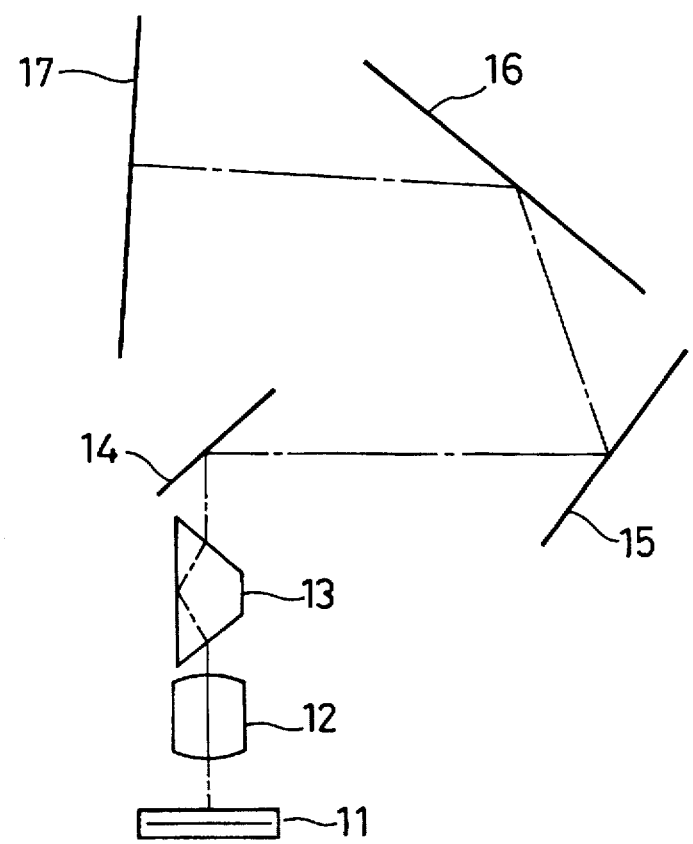
FIG. 1 is a diagram showing the optical path in a microfilm reader to which the present invention is applied.
Figure 2:
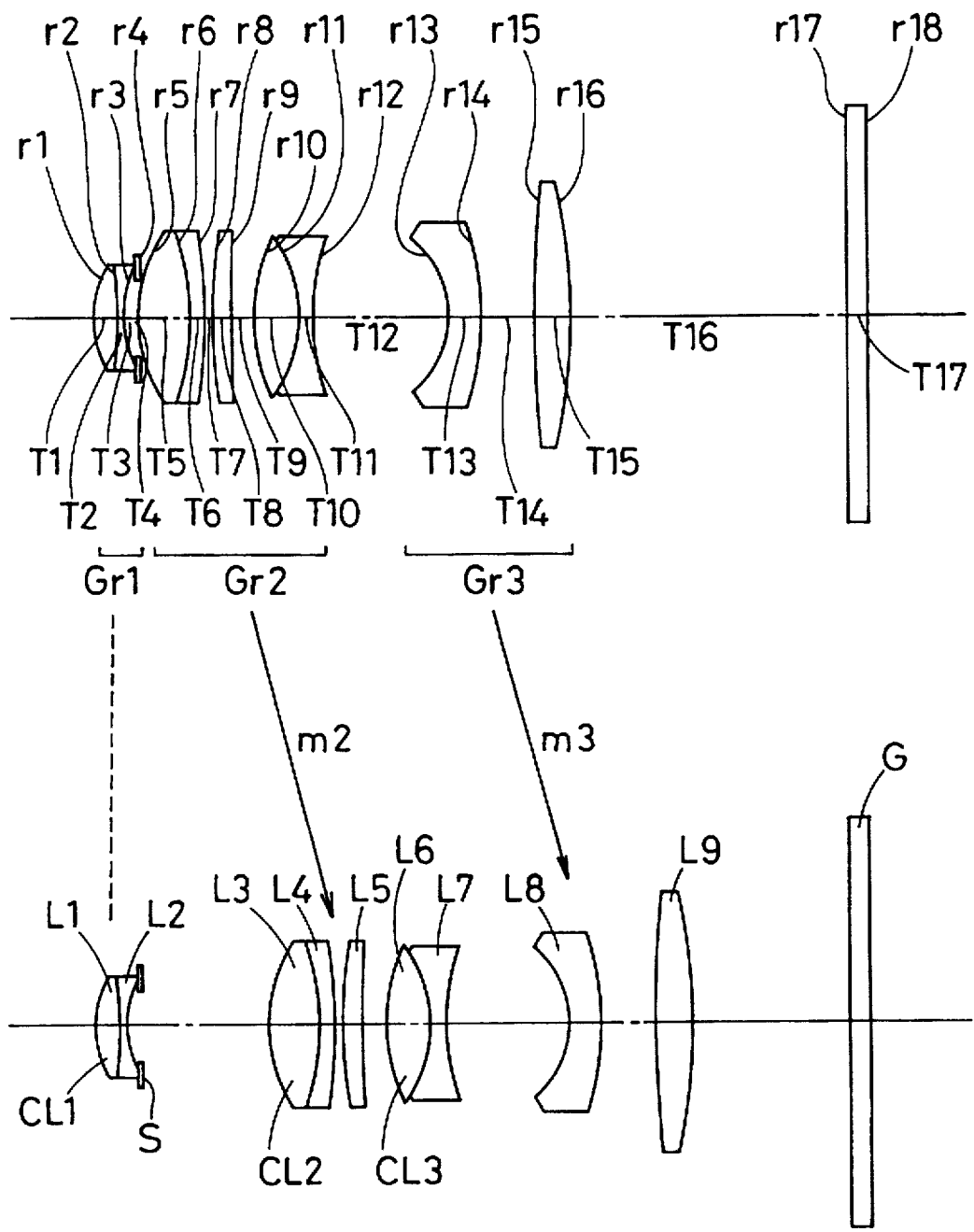
FIG. 2 is a cross-sectional view showing the lens arrangement of a first embodiment of the present invention.
Figure 3:
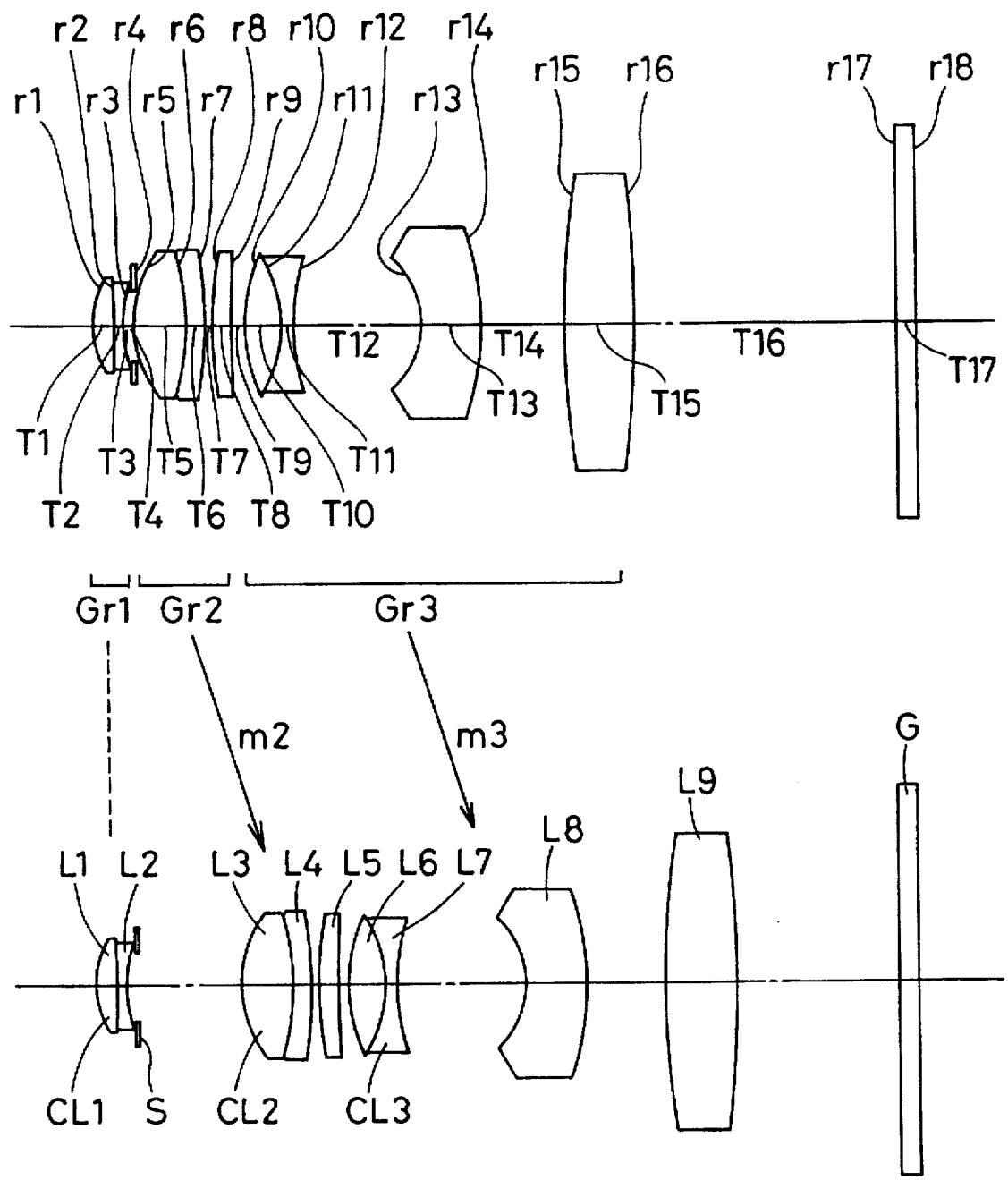
FIG. 3 is a cross-sectional view showing the lens arrangement of a second embodiment of the present invention.
Figure 4:
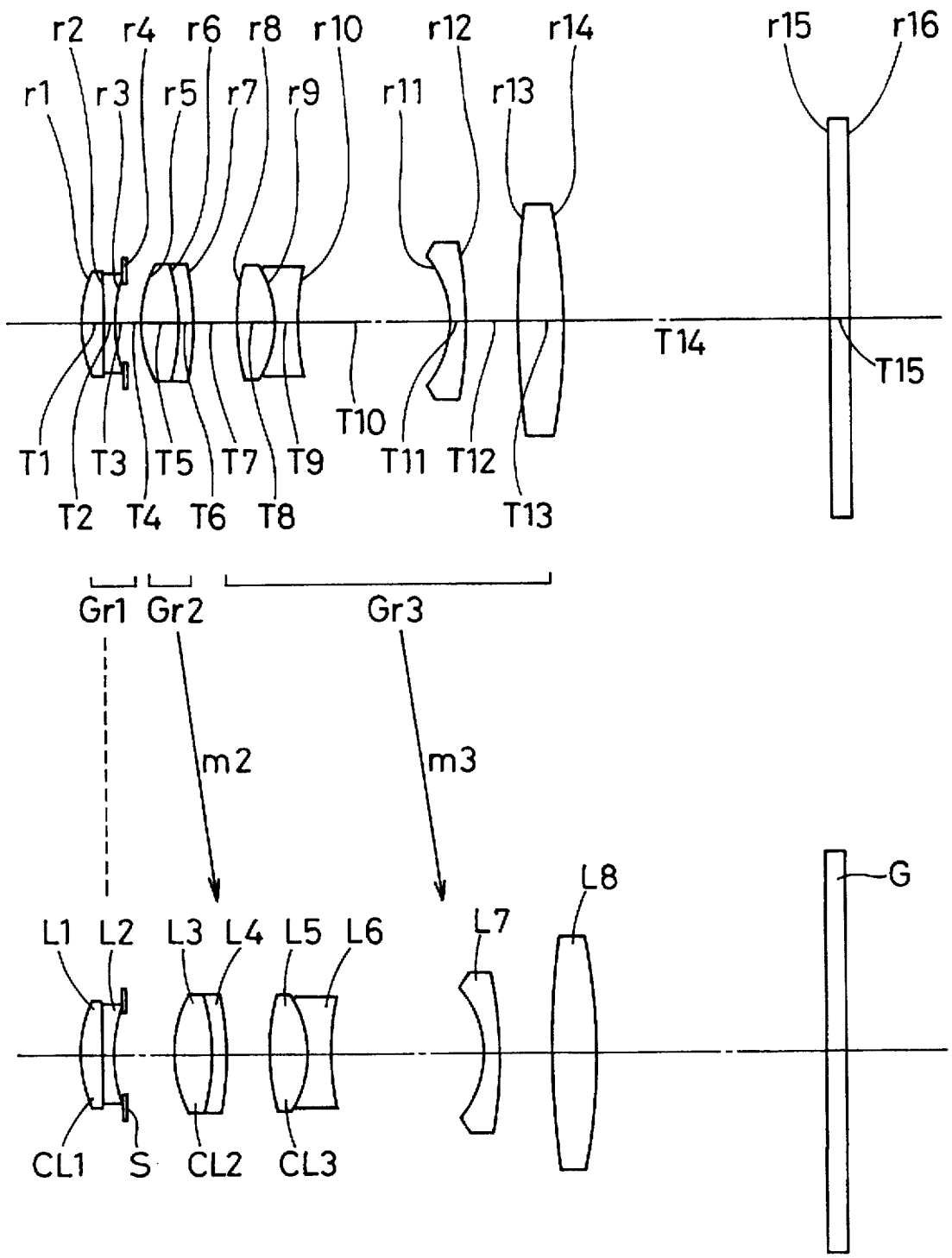
FIG. 4 is a cross-sectional view showing the lens arrangement of a third embodiment of the present invention.

FIG. 1 is an optical path diagram showing an example of a microfilm reader to which the zoom lens system of the present invention is applied. In FIG. 1, a microfilm 11 is illuminated by an illumination optical system, which is not shown in the figure. The image on the microfilm 11 is enlarged and projected onto a screen 17 through a Dove prism 13 and mirrors 14 to 16 by a zoom lens system 12 embodying the present invention. Since the construction of the Dove prism 13 for rotating the image is well-known, no description will be given in this respect.

The zoom lens system 12 consists of, from the enlargement side, a first lens unit having a negative refractive power, a second lens unit having a positive refractive power, and a third lens unit having a negative refractive power. During zooming from the longest-focal-length end to the shortest-focal-length end, the first lens unit is kept fixed, whereas the second and third lens units are each moved monotonically from the enlargement side to the reduction side.

The first lens unit consists only of a first doublet lens composed by joining together, from the enlargement side, a first lens element that is a biconvex lens and a second lens element that is a biconcave lens. Thus, since the first lens unit consists only of the first doublet lens that has a meniscus shape as a whole, both the reduction-side and enlargement-side principal points of the zoom lens system can be shifted toward the reduction side. As a result, it is possible to make the whole system compact in length, without sacrificing a sufficient distance between the first and second lens units, and without making extremely telephoto-oriented the refractive power arrangement in the lens units closer to the reduction side than the first lens unit.

Moreover, since the juncture surface between the first and second lens elements is a concave surface having a negative refractive power, it is possible to share the correction of the spherical aberration arising on the enlargement side of the juncture surface between the juncture surface and the reduction-side surface of the second lens element. Furthermore, the juncture surface of the first lens unit also serves to correct coma aberration.

The second lens unit includes, at its enlargement-side end, a second doublet lens composed by joining together, from the enlargement side, a third lens element that is a biconvex lens and a fourth lens element that is a negative meniscus

4 lens having its concave surface facing toward the enlargement side. In the second doublet lens, just as in the first doublet lens, since the juncture surface is a concave surface having a negative refractive power, it is possible to share the correction of the spherical aberration arising on the enlargement side of the juncture surface between the juncture surface and the reduction-side surface of the fourth lens element.

Moreover, in the second doublet lens, it is desirable that the third lens element be made of a material having a large Abbe number and the fourth lens element be made of a material having a small Abbe number. This construction permits effective correction of axial chromatic aberration.

Furthermore, in the zoom lens system of the present invention, as long as the zooming-ratio range is not made wider, it is possible to compose the second lens unit only of the second doublet lens, since, under that condition, the movement amount of the second lens unit during focusing is small and the variation in height of light rays incident on the second lens unit is also small.

The third lens unit includes a sixth lens element disposed at the reduction-side end and having a positive refractive power, and a fifth lens element disposed in the second position from the reduction-side end and having a negative refractive power. This arrangement of the reduction-side lens elements in the third lens unit permits effective correction of distortion over the whole system, since the barrel-shaped distortion arising within the third lens unit cancels out the pincushion-shaped distortion inherent in a telephoto-oriented zoom lens system.

Moreover, it is desirable that the sixth lens element be made of a material having a small Abbe number and the fifth lens element be made of a material having a large Abbe number. This construction permits correction of chromatic aberration of magnification that remains uncorrected even after correction by the first and second lens units.

Furthermore, in the zoom lens system of the present embodiment, since at its reduction-side end is disposed a lens element having a positive refractive power, the reduction-side pupil position is shifted toward the reduction side. This makes it possible to realize in a simple construction the lens systems in the illumination optical system for illuminating the microfilm.

In the zoom lens system 12 of the present invention, an aperture diaphragm is disposed on the enlargement side of the second lens unit. This arrangement of the aperture diaphragm allows the Dove prism 13 for rotating the image to be made compact. Moreover, if the aperture diaphragm is kept fixed to the first lens unit during zooming, it is possible to prevent the effective diameter of the Dove prism 13 from varying with zooming.

In the zoom lens system 12 of the present invention, if a lens block composed of, from the enlargement side, a lens element having a positive refractive power and a lens element having a negative refractive power is disposed either at the reduction-side end of the second lens unit or at the enlargement-side end of the third lens unit, it is possible to correct spherical aberration and coma aberration effectively. The reason why the lens block may be disposed either at the reduction-side end of the second lens unit or at the enlargement-side end of the third lens unit is that, according to the present invention, the second and third lens units each move monotonically in the same direction during zooming, and accordingly there is not much difference between the movement amounts of the second and third lens units.

Furthermore, the above lens block may be realized as a third doublet lens composed by joining together, from the enlargement side, a biconvex lens and a biconcave lens. By realizing the lens block as the third doublet lens, it is possible to extend the zooming-ratio range without increasing the telephoto ratio.

Next, the conditional expressions satisfied by the zoom lens system of the present invention will be described below one by one.

$$n_n - n_p > 0 \quad (1)$$

where $n_p$: average refractive coefficient of all positive lens elements included in the whole system, $n_n$: average refractive coefficient of all negative lens elements included in the whole system.

Conditional expression (1) defines the relationship between the positive and negative lens elements of the whole system in terms of their refractive coefficients. Generally, in a lens system that is composed of a relatively small number, such as ten, of lens elements, it is necessary to give stronger refractive powers to the lens surfaces in order to keep down the total length. However, as the refractive powers of the lens surfaces are made stronger, the Petzval sum of the whole system becomes less, impairing the image-surface performance accordingly. In the zoom lens system of the present invention, the positive lens elements are made of a material having a relatively low refractive coefficient and the negative lens elements are made of a material having a relatively high refractive coefficient, so that conditional expression (1) is satisfied. As a result, it is possible to suppress the reduction in the Petzval sum of the whole system, and thus to maintain satisfactory image-surface performance without extending the total length.

$$0.34 < f_{23}/f_L < 0.4 \quad (2)$$

where $f_{23}$: composite focal length of the second and third lens units at the longest-focal-length end, $f_L$: focal length of the whole system at the longest-focal-length end.

Conditional expression (2) defines the focal length of the composite lens units composed of the second and third lens units. If the lower limit of conditional expression (2) is exceeded, various types of aberration arising in the second and third lens units become too large to correct with the first lens units. By contrast, if the upper limit of conditional expression (2) is exceeded, the total length of the whole system becomes too long to make the zoom lens system compact.

$$0.15 < n_{ip} - n_{in} < 0.5 \quad (3)$$

where $n_{ip}$: refractive coefficient of the positive lens element included in the i-th doublet lens (i=1, 2), $n_{in}$: refractive coefficient of the negative lens element included in the i-th doublet lens (i=1, 2).

Conditional expression (3) defines the refractive coefficient of the positive and negative lens elements of the first and second doublet lenses. This condition relates mainly to proper correction of spherical and coma aberration. If the lower limit of conditional expression (3) is exceeded, spherical and coma aberration is undercorrected. By contrast, if the upper limit of conditional expression (3) is exceeded, spherical and coma aberration is overcorrected. In addition, if the upper limit of conditional expression (3) is exceeded, the negative lens elements of the doublet lenses need to be made of a material having a considerably high refractive coefficient. This increases costs of manufacturing the zoom lens system.

$$18 < |v_3 - v_4| < 70 \quad (4)$$

where $v_3$: Abbe number of the third lens element, $v_4$: Abbe number of the fourth lens element.

Conditional expression (4) defines the Abbe number of each lens element constituting the second doublet lens. This condition relates mainly to proper correction of axial chromatic aberration. If the lower limit of conditional expression (4) is exceeded, axial chromatic aberration is undercorrected. By contrast, if the upper limit of conditional expression (4) is exceeded, axial chromatic aberration is overcorrected.

$$10 < |v_5 - v_6| < 30 \quad (5)$$

where $v_5$: Abbe number of the fifth lens element, $v_6$: Abbe number of the sixth lens element.

Conditional expression (5) defines the Abbe numbers of the fifth and sixth lens elements included in the third lens unit. This condition relates mainly to correction of chromatic aberration of magnification that is not sufficiently corrected by the second lens unit. If the lower limit of conditional expression (5) is exceeded, chromatic aberration of magnification is undercorrected. In particular, the more distant a ray is from the optical axis, the greater the difference in image-point positions between short-wavelength and long-wavelength components. By contrast, if the upper limit of conditional expression (5) is exceeded, chromatic aberration of magnification is overcorrected. Especially, extreme overcorrection occurs with endmost off-axial rays. As a result, the difference in image-point positions between short-wavelength and long-wavelength components extends in the opposite direction compared with the case when the lower limit is exceeded.

Next, embodiments of the zoom lens system of the present invention will be presented with their numerical data. In each embodiment, ri (i=1, 2, 3, . . . ) represents the curvature radius of the i-th surface from the object side, Ti (i=1, 2, 3, . . . ) represents the i-th axial distance from the object side, and Ni (i=1, 2, 3, . . . ) and vi (i=1, 2, 3, . . . ) represent the d-lines refractive coefficient and Abbe number of the i-th lens element from the object side. Moreover, the values at the longest- and shortest-focal-distance ends are both given, in this order from left, for the following items: the axial distance between the first and second lens units (T4 in all embodiments), the axial distance between the second and third lens units (T12 in the first embodiment, T9 in the second embodiment, T7 in the third, fourth, and sixth embodiments, and T11 in the fifth embodiment), the axial distance on the downstream side of third lens unit (T16 in the first and second embodiments, T14 in the third and fourth embodiments, and T15 in the fifth and sixth embodiments), the focal length of the whole system f, the f-number Fno, and the transverse magnification β. Furthermore, the mark ∞ in the curvature radius column of a surface indicates that the surface is a plane perpendicular to the optical axis (i.e. its curvature radius is infinite).

TABLE 1

Construction Data of Embodiment 1 f = 146.1~113.3
Fno = 12.3~9.5
$\beta$ = −1/6.8—1/9.7

| Curvature Radius | | Axial Distance | | Refractive Index | | Abbe Number | |
|---|---|---|---|---|---|---|---|
| r1 | 16.36 | T1 | 3.30 | N1 | 1.6129 | v1 | 37.0 |
| r2 | −100.72 | T2 | 1.12 | N2 | 1.8500 | v2 | 40.0 |
| r3 | 18.36 | T3 | 1.81 | | | | |
| r4 | ∞ | T4 | 0.12~19.06 | | | | |
| (aperture diaphragm) | | | | | | | |
| r5 | 23.88 | T5 | 7.20 | N3 | 1.5173 | v3 | 69.4 |
| r6 | −41.35 | T6 | 2.37 | N4 | 1.8335 | v4 | 21.0 |
| r7 | −89.10 | T7 | 1.18 | | | | |
| r8 | 79.63 | T8 | 2.97 | N5 | 1.6204 | v5 | 60.3 |
| r9 | 307.26 | T9 | 3.46 | | | | |
| r10 | 30.31 | T10 | 6.42 | N6 | 1.5927 | v6 | 35.5 |
| r11 | −22.72 | T11 | 2.17 | N7 | 1.8500 | v7 | 40.0 |
| r12 | 34.71 | T12 | 19.76~18.23 | | | | |
| r13 | −15.15 | T13 | 4.68 | N8 | 1.7292 | v8 | 54.7 |
| r14 | −46.40 | T14 | 8.00 | | | | |
| r15 | 249.73 | T15 | 5.36 | N9 | 1.7006 | v9 | 30.1 |
| r16 | −87.25 | T16 | 40.00~22.59 | | | | |
| r17 | ∞ | T17 | 3.00 | N10 | 1.5168 | v10 | 64.2 |
| r18 | ∞ | | | | | | |

TABLE 2

Construction Data of Embodiment 2 f = 147.5~120.7
Fno = 12.5~10.2
$\beta$ = −1/6.8—1/9.7

| Curvature Radius | | Axial Distance | | Refractive Index | | Abbe Number | |
|---|---|---|---|---|---|---|---|
| r1 | 16.79 | T1 | 3.07 | N1 | 1.6129 | v1 | 37.0 |
| r2 | −135.05 | T2 | 1.23 | N2 | 1.8500 | v2 | 40.0 |
| r3 | 18.75 | T3 | 1.80 | | | | |
| r4 | ∞ | T4 | 0.10~16.11 | | | | |
| (aperture diaphragm) | | | | | | | |
| r5 | 20.67 | T5 | 7.85 | N3 | 1.4565 | v3 | 90.8 |
| r6 | −43.84 | T6 | 2.74 | N4 | 1.8467 | v4 | 23.8 |
| r7 | −85.13 | T7 | 1.20 | | | | |
| r8 | 68.42 | T8 | 3.00 | N5 | 1.6968 | v5 | 55.5 |
| r9 | 205.14 | T9 | 2.11~1.66 | | | | |
| r10 | 27.66 | T10 | 5.60 | N6 | 1.5927 | v6 | 35.5 |
| r11 | −20.84 | T11 | 1.76 | N7 | 1.8500 | v7 | 40.0 |
| r12 | 35.87 | T12 | 19.50 | | | | |
| r13 | −14.67 | T13 | 9.26 | N8 | 1.7292 | v8 | 54.7 |
| r14 | −46.96 | T14 | 12.80 | | | | |
| r15 | 172.00 | T15 | 11.00 | N9 | 1.7006 | v9 | 30.1 |
| r16 | −185.77 | T16 | 40.00~24.45 | | | | |
| r17 | ∞ | T17 | 3.00 | N10 | 1.5168 | v10 | 64.2 |
| r18 | ∞ | | | | | | |

TABLE 3

Construction Data of Embodiment 3 f = 143.0~134.1
Fno = 10.9~10.2
$\beta$ = −1/6.8—1/7.5

| Curvature Radius | | Axial Distance | | Refractive Index | | Abbe Number | |
|---|---|---|---|---|---|---|---|
| r1 | 18.97 | T1 | 3.51 | N1 | 1.6129 | v1 | 37.0 |
| r2 | −138.69 | T2 | 1.85 | N2 | 1.8500 | v2 | 40.0 |
| r3 | 20.99 | T3 | 1.40 | | | | |
| r4 | ∞ | T4 | 2.00~7.28 | | | | |
| (aperture diaphragm) | | | | | | | |
| r5 | 19.53 | T5 | 5.78 | N3 | 1.4875 | v3 | 70.4 |
| r6 | −31.27 | T6 | 2.10 | N4 | 1.8467 | v4 | 23.8 |
| r7 | −57.19 | T7 | 6.56~6.39 | | | | |
| r8 | 31.62 | T8 | 5.99 | N5 | 1.5927 | v5 | 35.5 |
| r9 | −16.13 | T9 | 3.40 | N6 | 1.8500 | v6 | 40.0 |
| r10 | 42.62 | T10 | 22.97 | | | | |
| r11 | −15.11 | T11 | 2.50 | N7 | 1.6968 | v7 | 56.5 |
| r12 | −62.57 | T12 | 7.54 | | | | |
| r13 | 126.35 | T13 | 6.99 | N8 | 1.7006 | v8 | 30.1 |
| r14 | −98.37 | T14 | 40.00~34.89 | | | | |
| r15 | ∞ | T15 | 3.00 | N9 | 1.5168 | v9 | 64.2 |
| r16 | ∞ | | | | | | |

TABLE 4

Construction Data of Embodiment 4 f = 143.0~134.1
Fno = 10.8~10.1
$\beta$ = −1/6.8—1/7.5

| Curvature Radius | | Axial Distance | | Refractive Index | | Abbe Number | |
|---|---|---|---|---|---|---|---|
| r1 | 19.07 | T1 | 3.16 | N1 | 1.6057 | v1 | 37.8 |
| r2 | −143.75 | T2 | 1.99 | N2 | 1.8500 | v2 | 40.0 |
| r3 | 21.45 | T3 | 1.30 | | | | |
| r4 | ∞ | T4 | 2.30~7.60 | | | | |
| (aperture diaphragm) | | | | | | | |
| r5 | 22.14 | T5 | 5.44 | N3 | 1.5182 | v3 | 59.0 |
| r6 | −26.76 | T6 | 2.50 | N4 | 1.8467 | v4 | 23.8 |
| r7 | −51.25 | T7 | 8.56~8.38 | | | | |
| r8 | 30.54 | T8 | 5.37 | N5 | 1.5927 | v5 | 35.5 |
| r9 | −19.22 | T9 | 3.60 | N6 | 1.8500 | v6 | 40.0 |
| r10 | 37.23 | T10 | 23.48 | | | | |
| r11 | −15.99 | T11 | 2.59 | N7 | 1.7725 | v7 | 49.8 |
| r12 | −65.13 | T12 | 7.57 | | | | |
| r13 | 174.40 | T13 | 6.84 | N8 | 1.6734 | v8 | 29.3 |
| r14 | −71.12 | T14 | 40.00~34.90 | | | | |
| r15 | ∞ | T15 | 3.00 | N9 | 1.5168 | v9 | 64.2 |
| r16 | ∞ | | | | | | |

TABLE 5

Construction Data of Embodiment 5 f = 141.0~134.8
Fno = 11.0~10.5
$\beta$ = −1/7.0—1/7.5

| Curvature Radius | | Axial Distance | | Refractive Index | | Abbe Number | |
|---|---|---|---|---|---|---|---|
| r1 | 21.09 | T1 | 4.41 | N1 | 1.5407 | v1 | 47.2 |
| r2 | −86.10 | T2 | 2.60 | N2 | 1.8050 | v2 | 41.0 |
| r3 | 24.99 | T3 | 1.30 | | | | |
| r4 | ∞ | T4 | 2.60~6.03 | | | | |
| (aperture diaphragm) | | | | | | | |
| r5 | 19.07 | T5 | 7.00 | N3 | 1.5111 | v3 | 60.5 |

TABLE 5-continued

Construction Data of Embodiment 5 f = 141.0~134.8
Fno = 11.0~10.5
β = −1/7.0—1/7.5

| | Curvature Radius | | Axial Distance | Refractive Index | | Abbe Number | |
|---|---|---|---|---|---|---|---|
| r6 | −22.21 | T6 | 2.20 | N4 | 1.8050 | v4 | 41.0 |
| r7 | −56.68 | T7 | 12.55 | | | | |
| r8 | 103.13 | T8 | 6.55 | N5 | 1.7400 | v5 | 28.3 |
| r9 | −44.00 | T9 | 1.91 | | | | |
| r10 | −15.88 | T10 | 3.50 | N6 | 1.8050 | v6 | 41.0 |
| r11 | 202.87 | T11 | 22.00–18.81 | | | | |
| r12 | −43.15 | T12 | 2.01 | N7 | 1.7883 | v7 | 47.3 |
| r13 | 863.09 | T13 | 1.01 | | | | |
| r14 | 84.49 | T14 | 5.03 | N8 | 1.5927 | v8 | 35.5 |
| r15 | −68.99 | T15 | 47.41–47.18 | | | | |
| r16 | ∞ | T16 | 3.00 | N9 | 1.5168 | v9 | 64.2 |
| r17 | ∞ | | | | | | |

TABLE 6

Construction Data of Embodiment 6 f = 143.7~134.6
Fno = 10.9~10.3
β = −1/6.8—1/7.5

| | Curvature Radius | | Axial Distance | Refractive Index | | Abbe Number | |
|---|---|---|---|---|---|---|---|
| r1 | 20.02 | T1 | 3.50 | N1 | 1.6057 | v1 | 37.8 |
| r2 | −121.48 | T2 | 2.20 | N2 | 1.8500 | v2 | 40.0 |
| r3 | 22.62 | T3 | 1.20 | | | | |
| r4 | ∞ (aperture diaphragm) | T4 | 2.00–7.50 | | | | |
| r5 | 21.26 | T5 | 6.80 | N3 | 1.5176 | v3 | 53.5 |
| r6 | −23.94 | T6 | 2.50 | N4 | 1.8467 | v4 | 23.8 |
| r7 | −51.83 | T7 | 9.22–9.09 | | | | |
| r8 | 37.67 | T8 | 4.50 | N5 | 1.5927 | v5 | 35.5 |
| r9 | −26.23 | T9 | 0.90 | | | | |
| r10 | −21.07 | T10 | 3.62 | N6 | 1.8500 | v6 | 40.0 |
| r11 | 48.66 | T11 | 22.00 | | | | |
| r12 | −17.08 | T12 | 2.60 | N7 | 1.7725 | v7 | 49.8 |
| r13 | −67.38 | T13 | 4.60 | | | | |
| r14 | 711.51 | T14 | 6.87 | N8 | 1.6734 | v8 | 29.3 |
| r15 | −47.56 | T15 | 45.90–40.53 | | | | |
| r16 | ∞ | T16 | 3.00 | N9 | 1.5168 | v9 | 64.2 |
| r17 | ∞ | | | | | | |

FIGS. 2 to 7 show the lens constructions of the first to sixth embodiments, respectively. In each figure, the upper diagram illustrates the lens construction at the longest-focal-length end, and the lower diagram illustrates that at the shortest-focal-length end. Moreover, in each diagram, the left-hand side corresponds to the enlargement side, and the right-hand side corresponds to the reduction side. In each figure, the arrows m2 and m3 schematically show the movement of the second and third lens units Gr2 and Gr3, respectively, from the longest-focal-length end to the shortest-focal-length end.

In all of the first to sixth embodiments, the zoom lens system consists of, from the enlargement side, a first lens unit Gr1 having a negative refractive power, a second lens unit Gr2 having a positive refractive power, and a third lens unit Gr3 having a negative refractive power. To effect zooming from the longest-focal-length end to the shortest-focal-length end, the first lens unit Gr1 is kept fixed, whereas the second and third lens units Gr2 and Gr3 are each moved monotonically from the enlargement side to the reduction side. In all of the first to sixth embodiments, the zoom lens system performs zooming in the range of transverse magnifications β approximately between −1/7 to −1/9.

In all of the first to sixth embodiments, the aperture diaphragm S is disposed between the first and second lens units Gr1 and Gr2, that is, on the enlargement side of the second lens unit Gr2. The aperture diaphragms is kept fixed during zooming, as the first lens unit Gr1 is.

Furthermore, in each figure, a plane glass plate G is shown at the reduction-side end. This plane glass plate G corresponds to the microfilm-holding glass plate that is provided in the microfilm reader, and accordingly it serves to keep a microfilm in position together with another holding glass plate (not shown) by holding the microfilm in between.

In the zoom lens system of the first embodiment, each lens unit is composed, from the enlargement side, as follows. The first lens unit Gr1 consists only of a first doublet lens CL1 composed by joining together a lens element L1 (first lens) that is a biconvex lens and a lens element L2 (second lens) that is a biconcave lens. The second lens unit Gr2 consists of a second doublet lens CL2 composed by Joining together a lens element L3 (third lens) that is a biconvex lens and a lens element L4 (fourth lens) that is a negative meniscus lens having its concave surface facing toward the enlargement side, a lens element L5 that is a positive meniscus lens with its convex surface facing toward the enlargement side, and a third doublet lens CL3 composed by Joining together a lens element L6 that is a biconvex lens and a lens element L7 that is a biconcave lens. The third lens unit Gr3 consists of a lens element L8 (fifth lens) that is a negative meniscus lens with its concave surface facing toward the enlargement side, and a lens element L9 (sixth lens) that is a biconvex lens. The zoom lens system of the first embodiment has transverse magnifications β between −1/6.8 and −1/9.7, and a telephoto ratio ∞TL/$f_L$ of 0.72 at the longest-focal-length end.

In the zoom lens system of the second embodiment, each lens unit is composed, from the enlargement side, as follows. The first lens unit Gr1 consists only of a first doublet lens CL1 composed by joining together a lens element L1 (first lens) that is a biconvex lens and a lens element L2 (second lens) that is a biconcave lens. The second lens unit Gr2 consists of a second doublet lens CL2 composed by joining together a lens element L3 (third lens) that is a biconvex lens and a lens element L4 (fourth lens) that is a negative meniscus lens having its concave surface facing toward the enlargement side, and a lens element L5 that is a positive meniscus lens with its convex surface facing toward the enlargement side. The third lens unit Gr3 consists of a third doublet lens CL3 composed by joining together a lens element L6 that is a biconvex lens and a lens element L7 that is a biconcave lens, a lens element L8 (fifth lens) that is a negative meniscus lens with its concave surface facing toward the enlargement side, and a lens element L9 (sixth lens) that is a biconvex lens. The zoom lens system of the second embodiment has transverse magnifications β between −1/6.8 and −1/9.0, and a telephoto ratio ∞TL/$f_L$ of 0.74 at the longest-focal-length end.

In the zoom lens system of the third and fourth embodiments, each lens unit is composed, from the enlargement side, as follows. The first lens unit Gr1 consists only of a first doublet lens CL1 composed by joining together a lens element L1 (first lens) that is a biconvex lens and a lens element L2 (second lens) that is a biconcave lens. The second lens unit Gr2 consists only of a second doublet lens CL2 composed by joining together a lens element L3 (third lens) that is a biconvex lens and a lens element L4 (fourth lens) that is a negative meniscus lens having its concave surface facing toward the enlargement side. The third lens unit Gr3 consists of a third doublet lens CL3 composed by Joining together a lens element L5 that is a biconvex lens and a lens element L6 that is a biconcave lens, a lens element L7 (fifth lens) that is a negative meniscus lens with its concave surface facing toward the enlargement side, and a lens element L8 (sixth lens) that is a biconvex lens. The zoom lens system of both the third and fourth embodiments has transverse magnifications β between −1/6.8 and −1/7.5, and a telephoto ratio ∞TL/$f_L$ of 0.70 at the longest-focal-length end.

In the zoom lens system of the fifth embodiment, each lens unit is composed, from the enlargement side, as follows. The first lens unit Gr1 consists only of a first doublet lens CL1 composed by joining together a lens element L1 (first lens) that is a biconvex lens and a lens element L2 (second lens) that is a biconcave lens. The second lens unit Gr2 consists of a second doublet lens CL2 composed by joining together a lens element L3 (third lens) that is a biconvex lens and a lens element L4 (fourth lens) that is a negative meniscus lens having its concave surface facing toward the enlargement side, a lens element L5 that is a biconvex lens, and a lens element L6 that is a biconcave lens. The third lens unit Gr3 consists of a lens element L7 (fifth lens) that is a negative meniscus lens with its concave surface facing toward the enlargement side, and a lens element L8 (sixth lens) that is a biconvex lens. The zoom lens system of the fifth embodiment has transverse magnifications β between −1/7.0 and −1/7.5, and a telephoto ratio ∞TL/$f_L$ of 0.74 at the longest-focal-length end.

In the zoom lens system of the sixth embodiment, each lens unit is composed, from the enlargement side, as follows. The first lens unit Gr1 consists only of a first doublet lens CL1 composed by joining together a lens element L1 (first lens) that is a biconvex lens and a lens element L2 (second lens) that is a biconcave lens. The second lens unit Gr2 consists only of a second doublet lens CL2 composed by Joining together a lens element L3 (third lens) that is a biconvex lens and a lens element L4 (fourth lens) that is a negative meniscus lens having its concave surface facing toward the enlargement side. The third lens unit Gr3 consists of a lens element L5 that is a biconvex lens, a lens element L6 that is a biconcave lens, a lens element L7 (fifth lens) that is a negative meniscus lens with its concave surface facing toward the enlargement side, and a lens element L8 (sixth lens) that is a biconvex lens. The zoom lens system of the sixth embodiment has transverse magnifications β between −1/6.8 and −1/7.5, and a telephoto ratio ∞TL/$f_L$ of 0.71 at the longest-focal-length end.

FIGS. 8A–8F to 13A–13F are aberration diagrams corresponding to the first to sixth embodiments, respectively. Each figure illustrates aberration as observed when the object point is placed on the enlargement side and the image point is placed on the reduction side. FIGS. 8A to 13A, 8B to 13B, and 8C to 13C show aberration at the longest-focal-length end, whereas FIGS. 8D to 13D, 8E to 13E, and 8F to 13F show aberration at the shortest-focal-length end. In the spherical aberration diagrams FIGS. 8A to 13A and 8D to 13D, the solid line (d), dash-dot line (F), and dash-dot-dot line (C) show aberration for d-lines, F-lines, and C-lines, respectively. In the astigmatism diagrams FIGS. 8B to 13B and 8E to 13E, the broken line (DM) and the solid line (DS) show astigmatism on the meridional and sagittal image surfaces, respectively.

Furthermore, the first to sixth embodiments satisfy conditional expressions (1) to (5). The following Table 7 lists the values of conditional expressions (1) to (5) and the value of the telephoto ratio ∞TL/$f_L$ in each embodiment.

TABLE 7

Values of Conditional Expressions in Each Embodiment

| | Emb. 1 | Emb. 2 | Emb. 3 | Emb. 4 | Emb. 5 | Emb. 6 |
|---|---|---|---|---|---|---|
| $n_n - n_p$ Conditional Expression (1) | 0.21 | 0.21 | 0.21 | 0.23 | 0.20 | 0.23 |
| $f_2/f_L$ Conditional Expression (2) | 0.36 | 0.38 | 0.36 | 0.37 | 0.37 | 0.38 |
| $n_{1p} - n_{1n}$ Conditional Expression (3) | 0.24 | 0.24 | 0.24 | 0.24 | 0.26 | 0.24 |
| $n_{2p} - n_{2n}$ Conditional Expression (3) | 0.32 | 0.39 | 0.36 | 0.33 | 0.29 | 0.33 |
| $|v_3 - v_4|$ Conditional Expression (4) | 48.4 | 67.0 | 46.6 | 35.2 | 19.5 | 29.7 |
| $|v_5 - v_6|$ Conditional Expression (5) | 24.6 | 24.6 | 26.4 | 20.5 | 11.8 | 20.5 |
| ∞TL/$f_L$ Telephoto Ratio | 0.72 | 0.74 | 0.70 | 0.70 | 0.74 | 0.71 |

As described in detail above, the present invention provides a zoom lens system that is compact, with a telephoto ratio of approximately 0.70 at transverse magnifications β between −1/7 to −1/9, and at the same time capable of correcting spherical and coma aberration satisfactorily.

Accordingly, by applying the zoom lens system of the present invention as the optical system in apparatus such as microfilm readers and microfilm reader printers, it is possible to make such apparatus compact without degrading their optical performance.

What is claimed is:

1. A zoom lens system comprising, from an enlargement side:

a first lens unit having a negative refractive power as a whole and consisting of a first doublet lens composed by joining together, from an enlargement side, a first lens element that is a biconvex lens and a second lens element that is a biconcave lens;

a second lens unit having a positive refractive power as a whole and including, at its enlargement-side end, a second doublet lens composed by joining together, from an enlargement side, a third lens element that is a biconvex lens and a fourth lens element that is a negative meniscus lens with its concave surface facing toward an enlargement side;

a third lens unit having a negative refractive power as a whole, wherein, during zooming from a longest-focal-length end to a shortest-focal-length end, said first lens unit is kept fixed and said second and third lens units are each moved monotonically from an enlargement side to a reduction side.

2. A zoom lens system as claimed in claim 1, wherein said third lens unit comprises:

a sixth lens element disposed at a reduction-side end of the third lens unit and having a positive refractive power; and a fifth lens element disposed at an enlargement-side of said sixth lens element and having a negative refractive power.

3. A zoom lens system as claimed in claim 2,
wherein said fifth lens element is made of a material having a large Abbe number and said sixth lens element is made of a material having a small Abbe number.

4. A zoom lens system as claimed in claim 1,
wherein an aperture diaphragm is disposed on an enlargement side of said second lens unit.

5. A zoom lens system as claimed in claim 4,
wherein said aperture diaphragm is disposed on a reduction side of said first lens unit.

6. A zoom lens system as claimed in claim 4,
wherein said aperture diaphragm is fixed to said first lens unit to be stationary during zooming.

7. A zoom lens system as claimed in claim 1,
wherein said second lens unit consists only of said second doublet lens.

8. A zoom lens system as claimed in claim 1,
wherein said third lens element is made of a material having a large Abbe number and said fourth lens element is made of a material having a small Abbe number.

9. A zoom lens system as claimed in claim 1,
wherein a lens block consisting of, from an enlargement side, a lens element having a positive refractive power and a lens element having a negative refractive power is disposed on a reduction-side end of said second lens unit.

10. A zoom lens system as claimed in claim 1,
wherein a lens block consisting of, from an enlargement side, a lens element having a positive refractive power and a lens element having a negative refractive power is disposed on a enlargement-side end of said third lens unit.

11. A zoom lens system as claimed in claim 1,
wherein a third doublet lens composed by joining together, from an enlargement side, a lens element having a positive refractive power and a lens element having a negative refractive power is disposed on a reduction-side end of said second lens unit.

12. A zoom lens system as claimed in claim 1,
wherein a third doublet lens composed by joining together, from an enlargement side, a lens element having a positive refractive power and a lens element having a negative refractive power is disposed on a enlargement-side end of said third lens unit.

13. A zoom lens system as claimed in claim 1,
wherein the following condition is satisfied:

$$n_n - n_p < 0$$

where
$n_p$: average refractive coefficient of all positive lens elements included in the whole system,
$n_n$: average refractive coefficient of all negative lens elements included in the whole system.

14. A zoom lens system as claimed in claim 1,
wherein the following condition is satisfied:

$$0.34 < f_{23}/f_L < 0.4$$

where
$f_{23}$: composite focal length of the second and third lens units at a longest-focal-length end,
$f_L$: focal length of the whole system at a longest-focal-length end.

15. A zoom lens system as claimed in claim 1,
wherein the following condition is satisfied:

$$0.15 < n_{ip} - n_{in} < 0.5$$

where
$n_{ip}$: refractive coefficient of the positive lens element included in the i-th doublet lens (i=1, 2),
$n_{in}$: refractive coefficient of the negative lens element included in the i-th doublet lens (i=1, 2).

16. A zoom lens system as claimed in claim 1,
wherein the following condition is satisfied:

$$18 < |v_3 - v_4| < 70$$

where
$v_3$: Abbe number of the third lens element,
$v_4$: Abbe number of the fourth lens element.

17. A zoom lens system as claimed in claim 1,
wherein the following condition is satisfied:

$$10 < |v_5 - v_6| < 30$$

where
$v_5$: Abbe number of the fifth lens element,
$v_6$: Abbe number of the sixth lens element.

18. A microfilm projection apparatus comprising:
a microfilm holding means;
a zoom lens system;
a Dove prism; and
a screen,
wherein said zoom lens system comprises:
a first lens unit having a negative refractive power as a whole and consisting of a first doublet lens composed by joining together, from an enlargement side, a first lens element that is a biconvex lens and a second lens element that is a biconcave lens;
a second lens unit having a positive refractive power as a whole and including, at its enlargement-side end, a second doublet lens composed by joining together, from an enlargement side, a third lens element that is a biconvex lens and a fourth lens element that is a negative meniscus lens with its concave surface facing toward an enlargement side;
a third lens unit having a negative refractive power as a whole,
wherein, during zooming from a longest-focal-length end to a shortest-focal-length end, said first lens unit is kept fixed and said second and third lens units are each moved monotonically from an enlargement side to a reduction side.

19. A microfilm projection apparatus as claimed in claim 18,
wherein said third lens unit in said zoom lens system comprises:

a sixth lens element disposed at a reduction-side end of the third lens unit and having a positive refractive power; and a fifth lens element disposed at an enlargement-side end of the third lens unit and having a negative refractive power.

20. A microfilm projection apparatus as claimed in claim 18, wherein, in said zoom lens system, an aperture diaphragm is disposed on an enlargement side of said second lens unit.

21. A microfilm projection apparatus as claimed in claim 20, wherein, in said zoom lens system, said aperture diaphragm is disposed on a reduction side of said first lens unit.

22. A microfilm projection apparatus as claimed in claim 20, wherein, in said zoom lens system, said aperture diaphragm is fixed to said first lens unit to be stationary during zooming.

* * * * *